United States Patent [19]
Allred et al.

[11] Patent Number: 5,609,521

[45] Date of Patent: Mar. 11, 1997

[54] BAIT CUTTING BOARD

[76] Inventors: Steven E. Allred; Robin E. Allred, both of 2162 Longbow La., Clearwater, Fla. 34624

[21] Appl. No.: 543,265

[22] Filed: Oct. 16, 1995

[51] Int. Cl.[6] .................................................. A22C 25/06
[52] U.S. Cl. .......................................... 452/194; 452/185
[58] Field of Search .................................... 452/194, 185, 452/195, 196

[56] References Cited

U.S. PATENT DOCUMENTS

| | | | |
|---|---|---|---|
| D. 233,203 | 10/1974 | Hughes | 452/194 |
| 3,165,779 | 1/1965 | Teetor et al. | 452/195 |
| 3,500,495 | 3/1970 | Morse | 452/195 |
| 3,590,423 | 7/1971 | Messer | 452/194 |
| 4,229,858 | 10/1980 | Baxter et al. | 452/194 |
| 5,098,338 | 3/1992 | Jensen | 452/194 |
| 5,474,494 | 12/1995 | Sims | 452/194 |

*Primary Examiner*—Willis Little
*Attorney, Agent, or Firm*—American Innovations, Inc.; Dorothy S. Morse

[57] ABSTRACT

A bait cutting board with a cutout portion on its perimeter to allow attachment of the bait cutting board to a cleat on a boat. An adjustable brace closes across the cutout portion to securely attach the bait cutting board to the boat cleat so that a portion of the bait cutting board may be suspended over water during use. Shims attached to the lower surface of the bait cutting board engage the boat and level the working surface of the bait cutting board. In its preferred embodiment a rail, which is supported by rail posts, is positioned around the perimeter of the bait cutting board to keep desirable parts of the bait from falling off the working surface of the bait cutting board, while at the same time allowing undesirable parts of the bait to be easily swept under the rail and into the water below. The rail may be omitted from the near edge of the perimeter to provide a user with easier access to the working surface of the bait cutting board.

15 Claims, 2 Drawing Sheets

BAIT CUTTING BOARD

BACKGROUND—FIELD OF INVENTION

This invention relates to cutting boards, specifically to a bait cutting board having a perimeter rail and means for attachment to a cleat on a boat.

BACKGROUND—DESCRIPTION OF PRIOR ART

It is well known for fishermen to use a flat bait cutting board to support bait while it is being cut. It is preferred that the bait cutting board be placed at, a convenient height so that the fisherman does not have to bend over to use it. It is also preferred that the bait cutting board be placed in a location where unwanted parts of the bait can be conveniently swept from the bait cutting board surface, preferably into the water below. However, on many boats it is not always easy to find an ideal location to use a conventional bait cutting board. Also, when a conventional bait cutting board is placed in a location where unwanted parts of the bait can be conveniently swept from the bait cutting board, there is usually no way to secure the bait cutting board and it is subject to loss overboard. It is not known to have a bait cutting board that may be attached to the cleat of a boat to prevent it from overboard loss and permit a fisherman to use it without having to bend over.

SUMMARY OF INVENTION—OBJECTS AND ADVANTAGES

It is the primary object of this invention to provide a bait cutting board that would be securely attached to a cleat on a boat. It is also an object of this invention to provide a flat surface that is suspended at least partially over the side of a boat so that unwanted parts of the bait can be quickly and conveniently swept from the bait cutting board surface and into the water below. A further object of this invention is to provide a bait cutting board having a rail around its perimeter to keep wanted parts of the bait from accidentally falling into the water. It is also an object of this invention that the bait cutting board be made of materials strong enough to resist damage from the cutting action of a bait cutting knife. It is also an object of this invention to provide a bait cutting board that may be used on a boat in such a way to permit a person to use it without having to bend over.

As described herein, properly manufactured and installed around a cleat on a boat, the present invention would provide a bait cutting board that it is safe from overboard loss and permits a fisherman to use it without having to bend over. Shims attached to the underneath surface of the bait cutting board would level the bait cutting board and create a horizontal working surface. The shims would also help level the bait cutting board in attachment to different types of boats. A rail, supported by rail posts, is positioned around the perimeter of the side edges and the perimeter of the edge of the bait cutting board remote from the user. This rail would help prevent wanted parts of the bait from falling into the water, while at the same time allowing unwanted parts of the bait to be easily swept under the rail and from the working surface of the bait cutting board. Omission of a rail on the perimeter of the near edge would provide the user with easier access to the bait cutting surface. Wing bolts, nut plates and nut plate slots would allow the brace to be opened for attachment of a cutout portion of the bait cutting board around the cleat of a boat. They would also allow the brace to be adjustable so that the bait cutting board could be securely attached to each cleat during use.

The description herein provides preferred embodiments of the present invention but should not be construed as limiting the scope of the bait cutting board invention. Variations in the size and shape of the cutting board surface, size and shape of the cut out portion of the cutting board allowing attachment of the present invention around the cleat of a boat, the height and type of perimeter rail, the type of rail support, the number and positioning of the shims underneath the invention, the type of brace attaching the bait cutting board to the cleat of a boat, and the materials used for the various parts of the invention, other than those shown and described herein, can be incorporated into the present invention. Thus the scope of the present invention should be determined by the appended claims and their legal equivalents, rather than the examples given.

DETAILED DESCRIPTION OF PREFERRED EMBODIMENTS

Figure 1:
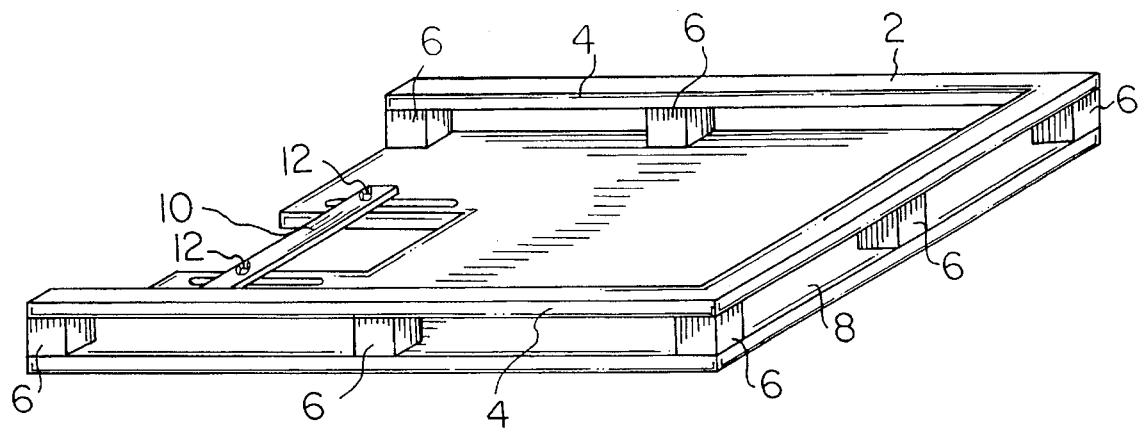
FIG. 1 is a top right side view of the invention showing the perimeter rail and rail supports.

FIG. 1 shows one embodiment of the present invention having a rectangular cutting board 8 with a perimeter rail 4 along three of its four sides. Rail posts 6, positioned between cutting board 8 and perimeter rail 4, support perimeter rail 4 and allow space for unwanted parts of bait (not shown) to be pushed away from the user and from the working surface of cutting board 8. Cutting board 8, perimeter rail 4 and rail posts 6 can be separate pieces assembled together, or made by injection molding into a one-piece unit. The material out of which cutting board 8 is made is not critical. However, cutting board 8 should be made of a durable, lightweight material that can withstand repeated cutting strokes of a bait cutting knife without damage. It is also contemplated for cutting board 8 to have shapes other than the rectangular shape shown in FIG. 1.

FIG. 1 also shows the preferred embodiment of the present invention having a cutout portion along the edge of cutting board 8 closest to the user (not shown), a brace 10, and wing bolts 12 connecting brace 10 to cutting board 8 across its cutout portion. Although the use of wing bolts 12 might make the positioning of the present invention around a boat cleat (not shown) faster and more convenient, the use of wing bolts 12 is not critical to the present invention. It is contemplated in the present invention to also have other means for connecting brace 10 to cutting board 8.

Figure 2:
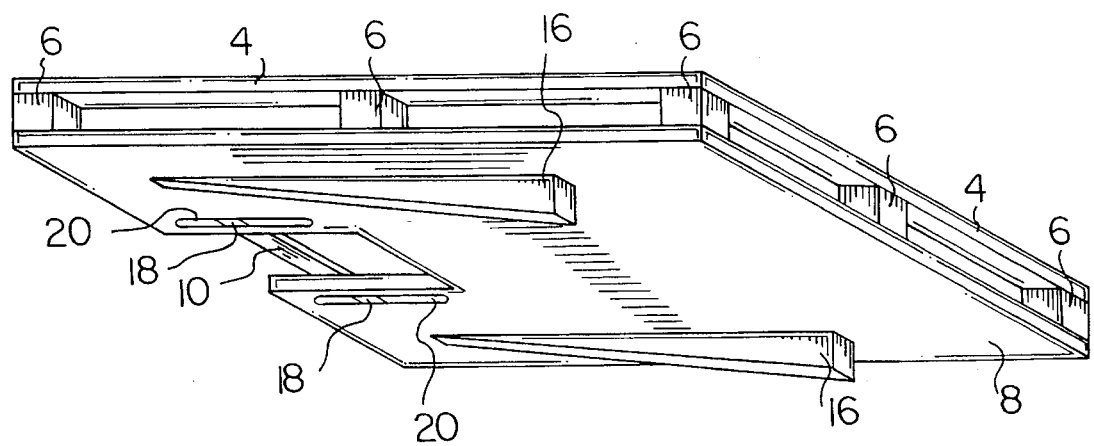
FIG. 2 is a bottom right side view of the invention showing the positioning of the shims underneath it.
Figure 3:
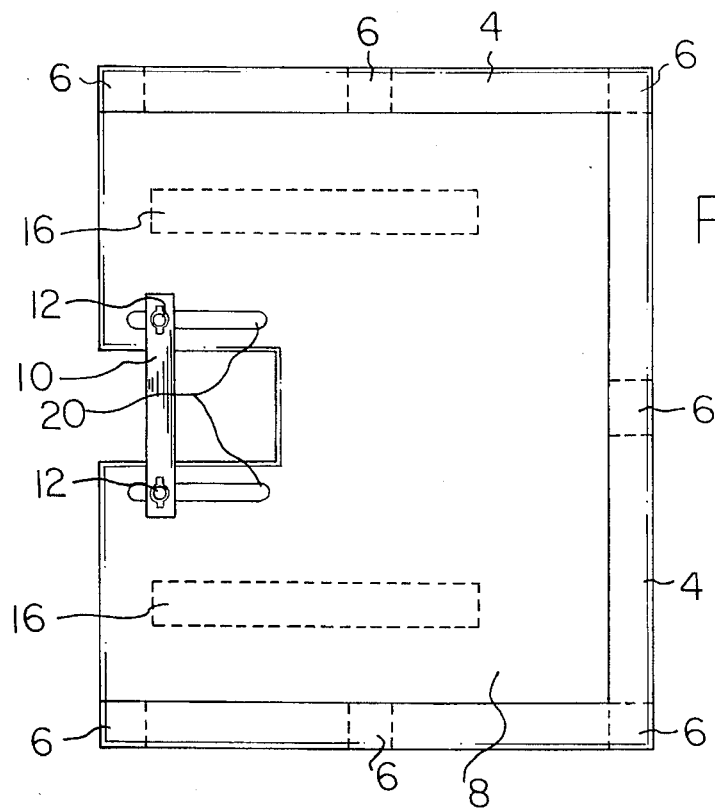
FIG. 3 is a top view of the invention with the cutting board brace in a closed position.
Figure 4:
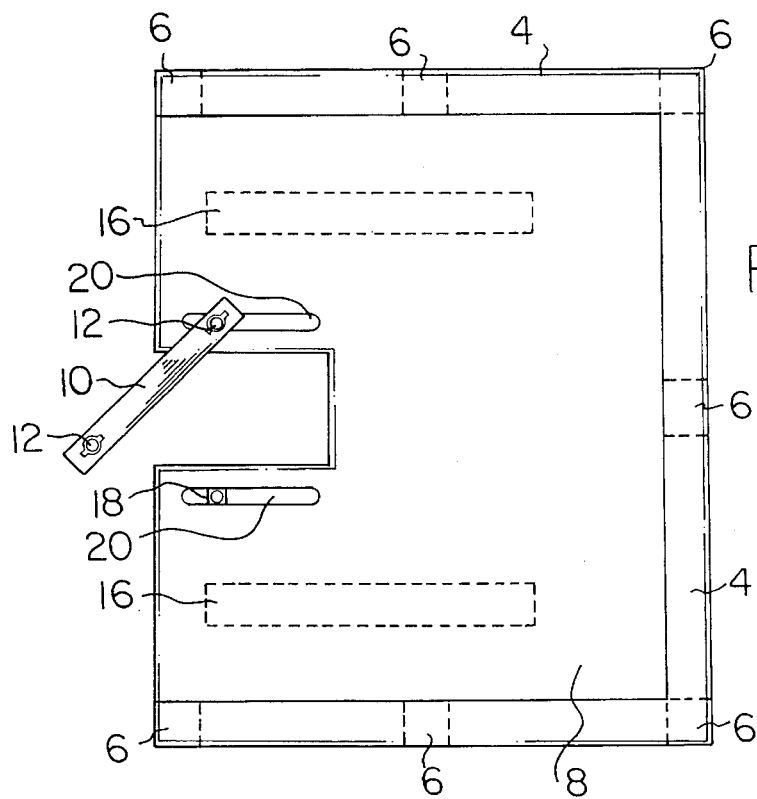
FIG. 4 is a top view of the invention with the cutting board brace in an open position.

FIG. 2 shows the present invention having shims 16 on the underneath surface of cutting board 8 and nut plates 18 positioned in nut plate slots 20. Shims 16 provide a means for leveling the upper working surface of the present invention during attachment around the cleat of a boat. Nut plates 18 and nut plate slots 20, in combination with wing bolts 12 shown in FIGS. 3 and 4, provide a means for opening and closing brace 10 and securely fastening brace 10 around a cleat on a boat. FIGS. 3 and 4 show brace 10 in closed and open positions, respectively.

What is claimed is:

1. A cutting board attachable to a boat comprising: a quantity of rigid, cut-resistant material having a perimeter; a cutout portion extending through said perimeter, said cutout portion having dimensions slightly greater than a cleat on said boat; closing means for said cutout portion, said closing means being movable between open and closed positions; and means to attach said closing means to said quantity of rigid, cut-resistant material so that said closing means may be moved from said open position, that allows said cutout portion to be placed adjacent to said cleat on said boat, to a closed position that securely attaches said cutting board around said cleat leveling means associated with said board for placing said board in a substantially horizontal position after being attached to said cleat.

2. The cutting board of claim 1 further comprising a rail attached adjacent to said perimeter and means for attaching said rail to said perimeter.

3. The cutting board of claim 2 wherein said rail is omitted from said perimeter adjacent to said cutout portion.

4. The cutting board of claim 2 wherein said means for attaching said rail to said perimeter comprises a plurality of rail posts so that spaces remain between said rail posts for pushing unwanted debris therethrough.

5. The cutting board of claim 4 wherein said quantity of rigid, cut-resistant material, said rail and said rail posts are formed as a one piece unit by conventional injection molding processes.

6. The cutting board of claim 1 wherein said quantity of rigid, cut-resistant material has an underside surface and said leveling means comprising a plurality of shims attached to said underside surface.

7. The cutting board of claim 1 wherein said closing means comprises a brace and said means for attaching said closing means comprises a plurality of wing bolts, a plurality of nut plates, and a plurality of nut plate slots.

8. A cutting board attachable to a boat comprising: a quantity of rigid, cut-resistant material having a perimeter and an underside surface; a cutout portion extending through said perimeter said cutout portion having dimensions slightly greater than a cleat on said boot; a rail attached adjacent to said perimeter; a plurality of rail posts for attaching said rail to said perimeter so that spaces remain between said rail posts for pushing unwanted debris therethrough; closing means for said cutout portion, said closing means being movable between open and closed positions; a plurality of shims attached to said underside surface for placing said quantity of rigid, cut-resistant material into an approximately horizontal position during use; and means to attach said closing means to said quantity of rigid, cut-resistant material so that said cutting board may be placed into a usable position by placing said closing means into said open position, placing said cutout portion adjacent to a cleat on said boat and then placing said closing means into said closed position around said cleat to securely attach said cutting board to said cleat.

9. The cutting board of claim 8 wherein said rail is omitted from said perimeter adjacent to said cutout portion.

10. The cutting board of claim 8 wherein said quantity of rigid, cut-resistant material, said rail and said rail posts are formed as a one piece unit by conventional injection molding processes.

11. The cutting board of claim 8 wherein said closing means are adjustable to permit said cutting board to be attached to different boats.

12. The cutting board of claim 8 wherein said closing means comprises a brace and said means for attaching said closing means comprises a plurality of wing bolts, a plurality of nut plates, and a plurality of nut plate slots.

13. A cutting board attachable to a boat comprising: a quantity of rigid, cut-resistant materail having a perimeter and an underside surface; a cutout portion extending through said perimeter, said cutout portion having dimensions slightly greater than a cleat on said boat; a plurality of slots adjacent to said cutout portion; a rail attached adjacent to said perimeter, a plurality of rail posts for attaching said rail to said perimeter so that spaces remain between said rail posts for pushing unwanted debris therethrough; a plurality of shims attached to said underside surface for placing said quantity of rigid, cut-resistant material into an approximately horizontal position during use; a brace connected across said cutout portion, said brace movable between open and closed positions, a plurality of wing bolts removably attaching said brace to said quantity of rigid, cut-resistant material; and a plurality of nut plates attached between said wing bolts and said slots so that said cutting board may be placed into a usable position by moving said brace into said open position, placing said cutout portion adjacent to a cleat on said boat, and then placing said brace into said closed position around said cleat to securely attach said cutting board to said cleat.

14. The cutting board of claim 13 wherein said rail is omitted from said perimeter adjacent to said cutout portion.

15. The cutting board of claim 13 wherein said quantity of rigid, cut-resistant material, said rail posts are formed as a one piece unit by conventional injection molding processes.

* * * * *